June 16, 1931.  C. P. HARRISON  1,810,241
CHASER AND CHASER HOLDER
Filed Aug. 5, 1929
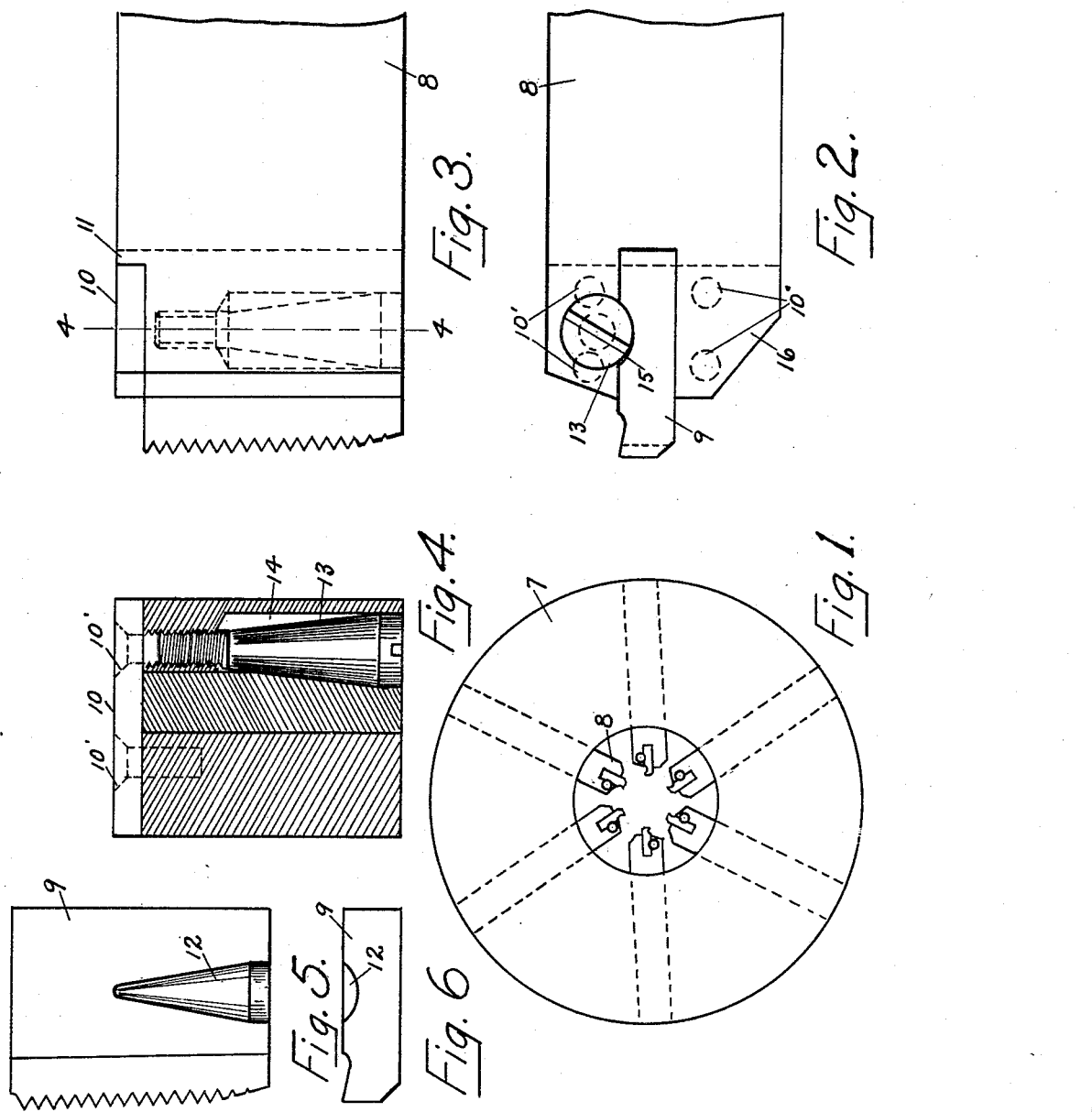
INVENTOR
Charles P. Harrison.
BY
ATTORNEY.

Patented June 16, 1931

1,810,241

UNITED STATES PATENT OFFICE

CHARLES P. HARRISON, OF WESLEYVILLE, PENNSYLVANIA, ASSIGNOR TO JARECKI MANUFACTURING CO., OF ERIE, PENNSYLVANIA, A CORPORATION OF PENNSYLVANIA

CHASER AND CHASER HOLDER

Application filed August 5, 1929. Serial No. 383,572.

My said invention relates to a die head of a pipe threading machine of that type where the chasers are mounted in holders to slide radially to position therein for various sizes of pipe within the capacity of the die head.

An object of the invention is to provide means whereby the chaser is clamped and held in three directions by one clamping means.

Another object of the invention is to provide means whereby the clamping means holds the chaser solidly against its support and in the same direction as the thrust of the cutting action.

Another object of the invention is to provide means whereby the clamping means may be operated entirely from the front of the die head, which decreases the time required for changing chasers and makes the parts more readily accessible.

Another object of the invention is to provide means whereby the clamping means is subject to no increase in load due to the thrust of the cutting action.

Referring to the drawings which are made a part thereof and in which similar reference characters indicate similar parts:

Fig. 1 is a front elevation showing the chasers and holders as they are assembled in a die head, Fig. 2 a front elevation of a chaser on an enlarged scale showing it mounted in the holder, Fig. 3 a side elevation of the chaser and chaser holder viewed from above in Fig. 2, Fig. 4 a sectional end view thru the chaser holder, chaser, and clamping screw, on line 4—4 of Fig. 3, Fig. 5 is a side elevation of the chaser, and Fig. 6 an end elevation of the same.

In the drawings reference character 7 indicates a die head having radial slots in which the chaser holders 8 are slidably mounted.

Each chaser holder has a slot cut through the same from front to rear into which the chaser 8 fits, the chaser being located by contact of its face farthest from the axis of the head with the bottom of the slot, the "bottom" being that face which is most remote from the axis of the head, A hardened plate 10 is secured in a recess at the back of the chaser holder by screws 10'; said recess does not extend to the bottom of the chaser slot but leaves an opening 11 at the rear end of the chaser slot through which dirt and chips can be pushed out of the holder so as not to interfere with proper positioning of the chaser in the slot of the holder. It is found by experience that when this slot is completely closed by the plate 10, it is almost impossible to remove all chips from the corner, said ships thereby being wedged between the chaser and the chaser holder, causing misalignment of the chasers and spoiling of threads.

The chaser 9 has an indentation 12 in its side adjacent to the cutting edge, forming a portion of a bearing for the clamping screw 13, which is formed with a cylindrical head, a conical body and a reduced threaded end.

The threaded end screws into the chaser holder, the cylindrical head bears in a cylindrical hole 14 in said chaser holder and in the outer part of the indentation at 12 in the chaser, and the conical body engages the conical part of the indentation 12 in the chaser 9.

The distance from the center of the indentation 12 to the back end of the chaser is slightly greater than the distance from the center of the clamping screw to the back of the slot in the holder, thereby causing the conical surface of the clamping screw to press the chaser against the bottom of the slot and allowing a slight clearance 15 in front of the clamping screw. As shown in Fig. 2 the front end of indentation 12 is struck on a radius slightly longer than that of the screw, and the conical part is similarly made to clear the screw although clearance may be provided in other ways. The ideal condition is to make the threaded end of the clamping screw a left hand thread so that the turning action of tightening the clamping screw also has a tendency to thrust the chaser against the bottom of the slot, but this feature may be omitted with slight loss of proper clamping action because a left hand threaded screw is more or less confusing to a machine operator.

It is therefore obvious that screwing in the clamping screw 13 draws the chaser 9 up against the plate 10, and the wedging action of the conical body forces it down against the lower projection 16 of the holder 8, while the turning action of the screw together with the bearing toward the back of the chaser forces it against the back of the slot thus giving a clamping action in three directions with only one clamping screw.

In operation the thrust of the cut against the chaser forces it against the outer end of the projection 16 of the holder 8, back against the bottom of the slot and upward at the rear end by the leverage formed by the projection 16 acting as a fulcrum against the rear end of the upper projection of the holder, all without throwing any additional strain on the clamping screw 13.

It will be obvious to those skilled in the art that various other modifications may be made in my device without departing from the spirit of my invention and therefore I do not limit myself to what is shown in the drawings and described in the specification but only as set forth in the appended claims.

Having thus fully described my said invention, what I claim as new and desire to secure by Letters Patent is:—

1. The combination of a cutting tool substantially in the form of a parallelopiped, a holder having a slot providing spaced jaws to receive the tool, said slot exposing a cutting face of the tool and an end thereof, a plate extending across the slot at the other end of the tool and secured to the holder in spaced relation to the bottom of the slot to leave an outlet for chips and the like, a clamping screw having a cylindrical head fitting in an arcuate opening at the exposed end of the tool and in a coacting elongated arcuate opening in the holder, the opening in the tool being struck on a radius longer than that of the head to permit the head to force the tool toward the bottom of the slot, said screw having a tapered body engaging a conical face of slightly larger radius on the tool whereby the body of the screw may also act to force the tool against the bottom of the slot in the holder, said screw having a reduced threaded end for engagement with a threaded hole in the head adjacent said plate to draw the tool against said plate, whereby the tool is clamped simultaneously against the bottom of the slot and a side thereof and against said plate by said screw, substantially as set forth.

2. The combination of a die head, a chaser holder extending radially inward of the head and having a radial slot in its inner end said slot being parallel to the axis of the die head, a chaser in said slot, said chaser terminating short of the rear end of the slot, and a plate bearing against the rear end of the chaser said plate being secured to the chaser holder and terminating short of the bottom of the slot so as to leave an outlet for chips and the like at the bottom of the slot, substantially as set forth.

3. The combination of a die head, a radially movable chaser holder therefor having a slot in its inner end parallel to the axis of the die head, a chaser fitting in said slot said chaser having a longitudinal arcuate indentation, and a clamping screw in a bore at one side of said slot said screw having a conical body and a cylindrical head partly entered in said indentation, the indentation in the chaser being struck on a greater radius than that of the body of the screw to force the chaser toward the bottom of the slot, substantially as set forth.

4. The combination of a cutting tool substantially in the form of a parallelopiped said tool having a tapered indentation in one face, a holder having a slot providing spaced jaws to receive the tool said slot exposing a cutting face of the tool and an end thereof, means at the other end of the tool providing an abutment for engaging the tool, and a single unitary clamping screw in a jaw of the holder, said screw having a tapered body engaging said indentation to force the tool simultaneously against the opposite jaw of the holder and against said abutment, and said indentation being struck on a radius greater than that of the adjacent portion of the screw whereby rotation of the screw also forces the chaser toward the bottom of the slot.

5. The combination of a die head, a chaser holder thereon extending radially inward of the head and having a slot in its inner end parallel to the axis of the die head, a chaser fitting in said slot, and a unitary clamping screw extending axially of the die head, said screw having a smooth body portion of circular cross-section and said chaser having a corresponding indentation struck on a greater radius whereby rotation of the screw acts on the chaser to force the same against the bottom of the slot in the same direction as the radial thrust of the cutting action, substantially as set forth.

6. The combination of a die head, a radially movable chaser holder thereon having a slot in its inner end parallel to the axis of the die head, a chaser fitting in said slot, means providing a fixed abutment at the rear of the slot to limit rearward movement of the chaser, and a single clamping screw having a tapered body and said chaser having a correspondingly shaped indentation whereby rotation of the screw forces the chaser against said abutment, the indentation being struck on a larger radius than the body of the screw whereby the screw also acts to force the chaser against the bottom of the slot in the same direction as the thrust of the cutting action, substantially as set forth.

In testimony whereof I affix my signature.

CHARLES P. HARRISON.